US010518681B2

(12) United States Patent
Marquette et al.

(10) Patent No.: US 10,518,681 B2
(45) Date of Patent: *Dec. 31, 2019

(54) VEHICLE HEADREST THERMAL CONDITIONER

(71) Applicant: Gentherm Incorporated, Northville, MI (US)

(72) Inventors: David Brian Marquette, Farmington Hills, MI (US); Daniel Charles Guerithault, Ann Arbor, MI (US); Ryan Michael Redwood, Northville, MI (US)

(73) Assignee: Gentherm Incorporated, Northville, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/754,563

(22) PCT Filed: Aug. 26, 2016

(86) PCT No.: PCT/US2016/048862
§ 371 (c)(1),
(2) Date: Feb. 22, 2018

(87) PCT Pub. No.: WO2017/040241
PCT Pub. Date: Mar. 9, 2017

(65) Prior Publication Data
US 2018/0257532 A1    Sep. 13, 2018

Related U.S. Application Data

(60) Provisional application No. 62/211,459, filed on Aug. 28, 2015.

(51) Int. Cl.
*B60N 2/879*     (2018.01)
*B60N 2/56*      (2006.01)
(Continued)

(52) U.S. Cl.
CPC ......... *B60N 2/879* (2018.02); *B60N 2/42727* (2013.01); *B60N 2/5635* (2013.01);
(Continued)

(58) Field of Classification Search
CPC .... B60N 2/879; B60N 2/888; B60N 2/42727; B60N 2/5621; B60N 2/5635; B60N 2/5671; B60N 2/5692
See application file for complete search history.

(56) References Cited

U.S. PATENT DOCUMENTS

| 6,261,173 B1 | 7/2001 | Odebrecht |
| 6,321,996 B1 | 11/2001 | Odebrecht et al. |

(Continued)

FOREIGN PATENT DOCUMENTS

| DE | 19654370 | 1/1998 |
| DE | 19949935 | 11/2000 |

(Continued)

OTHER PUBLICATIONS machine translation of the specification of EP 2620320 (Year: 2013).*

(Continued)

*Primary Examiner* — Philip F Gabler
(74) *Attorney, Agent, or Firm* — Carlson, Gaskey & Olds, P.C.

(57) ABSTRACT

A seat headrest assembly (16) includes a core (54) that includes a core bottom (56). A thermal conditioning device (22) includes a housing (26) that provides a fluid passage (28) that extends to a vent (62). A heating module (36) and a blower (38) are arranged in the fluid passage. The thermal conditioning device is arranged beneath the core bottom.

16 Claims, 3 Drawing Sheets

(51) Int. Cl.
B60N 2/427 (2006.01)
B60N 2/888 (2018.01)

(52) U.S. Cl.
CPC ......... B60N 2/5671 (2013.01); B60N 2/5692 (2013.01); B60N 2/888 (2018.02)

(56) References Cited

U.S. PATENT DOCUMENTS

| | | | |
|---|---|---|---|
| 6,604,785 B2 | 8/2003 | Bargheer et al. | |
| 6,644,735 B2 | 11/2003 | Bargheer et al. | |
| 6,761,399 B2* | 7/2004 | Bargheer | B60N 2/5628 297/180.12 |
| 7,075,034 B2 | 7/2006 | Bargheer et al. | |
| 7,503,625 B2 | 3/2009 | Bargheer et al. | |
| 7,581,785 B2 | 9/2009 | Heckmann et al. | |
| 7,708,626 B2 | 5/2010 | Bargheer et al. | |
| 7,873,451 B2 | 1/2011 | Hartmann et al. | |
| 8,752,892 B2 | 6/2014 | Sahashi | |
| 9,333,888 B2* | 5/2016 | Helmenstein | B60N 2/5671 |
| 10,071,612 B2* | 9/2018 | Thomas | B60N 2/80 |
| 2006/0273646 A1* | 12/2006 | Comiskey | A47C 7/74 297/408 |
| 2008/0191520 A1 | 8/2008 | Hartmann et al. | |
| 2008/0203781 A1* | 8/2008 | Bargheer | B60N 2/879 297/180.13 |
| 2008/0290703 A1 | 11/2008 | Bargheer et al. | |
| 2008/0315634 A1 | 12/2008 | Hartmann et al. | |
| 2011/0101741 A1* | 5/2011 | Kolich | B60N 2/5635 297/180.12 |
| 2013/0127210 A1* | 5/2013 | Jung | A47C 7/744 297/180.12 |
| 2016/0052362 A1* | 2/2016 | Thomas | B60N 2/80 62/3.3 |

FOREIGN PATENT DOCUMENTS

| | | |
|---|---|---|
| DE | 10160799 | 5/2007 |
| DE | 102007012416 | 9/2008 |
| DE | 102008022597 | 9/2009 |
| EP | 2620320 | 7/2013 |
| FR | 2905092 | 2/2008 |
| JP | H1156528 A | 3/1999 |
| JP | 2001171412 A | 6/2001 |
| JP | 2007186152 A | 7/2007 |
| JP | 2008295597 A | 12/2008 |
| JP | 2013119345 | 6/2013 |

OTHER PUBLICATIONS

International Preliminary Report on Patentability for International Application No. PCT/US2016/048862 dated Mar. 15, 2018.
Article—Development of S-Flow System & Control. Koichi Tabei Published Apr. 8, 2013. Downloaded from SAE International Mar. 23, 2018. pp. 1-9.
International Search Report and Written Opinion for PCT/US2016/048862 dated Nov. 30, 2016.
Japanese Rejection for Application No. 2018-511262 dated May 15, 2019.

\* cited by examiner

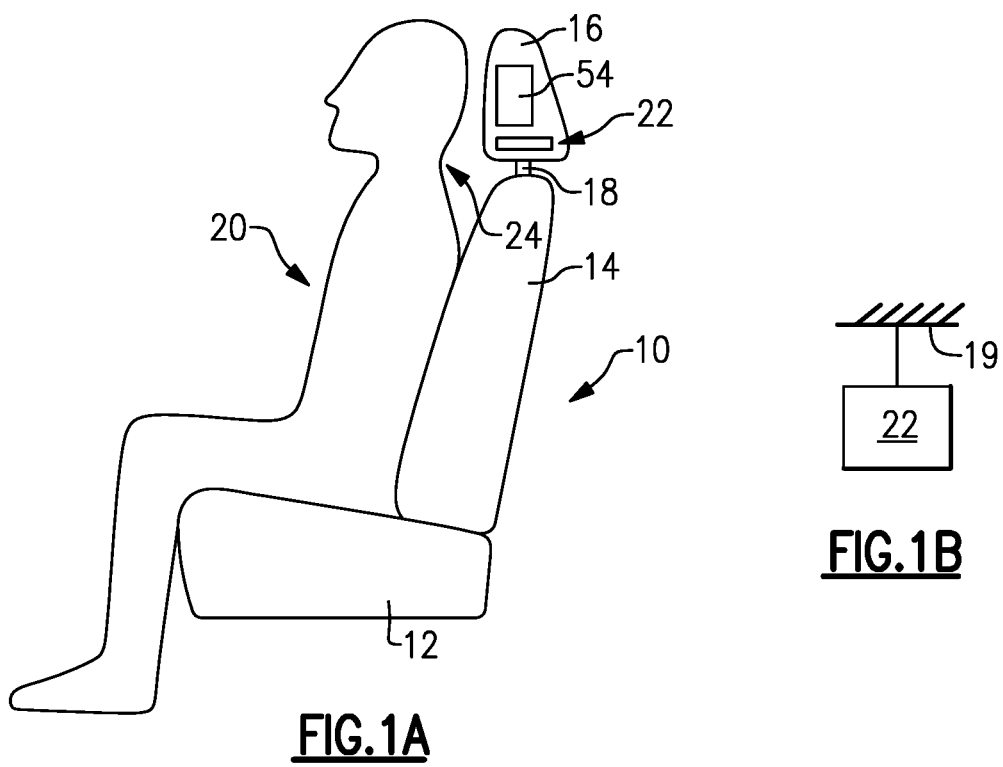
FIG.1A
FIG.1B
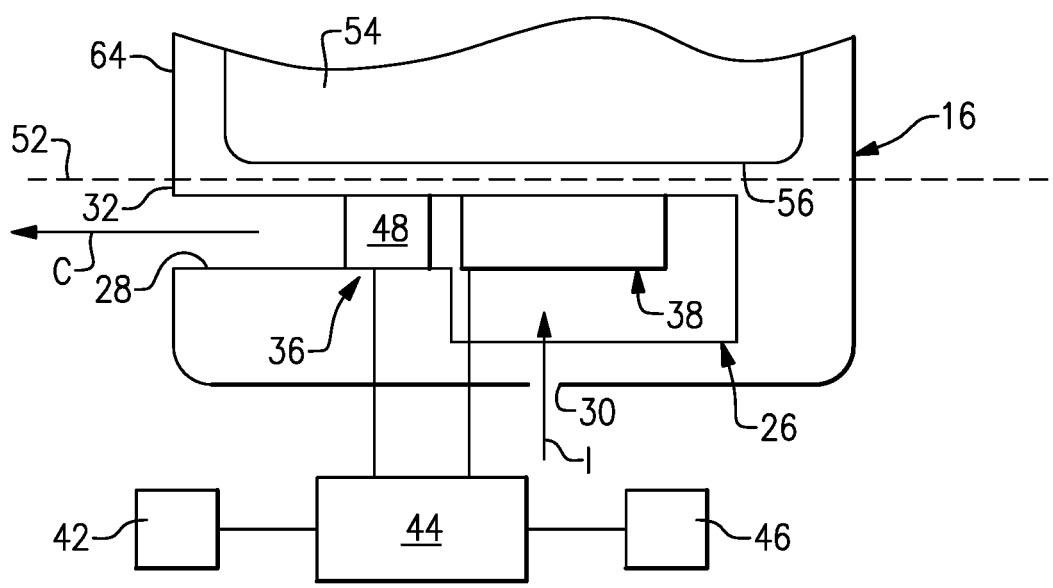
FIG.2

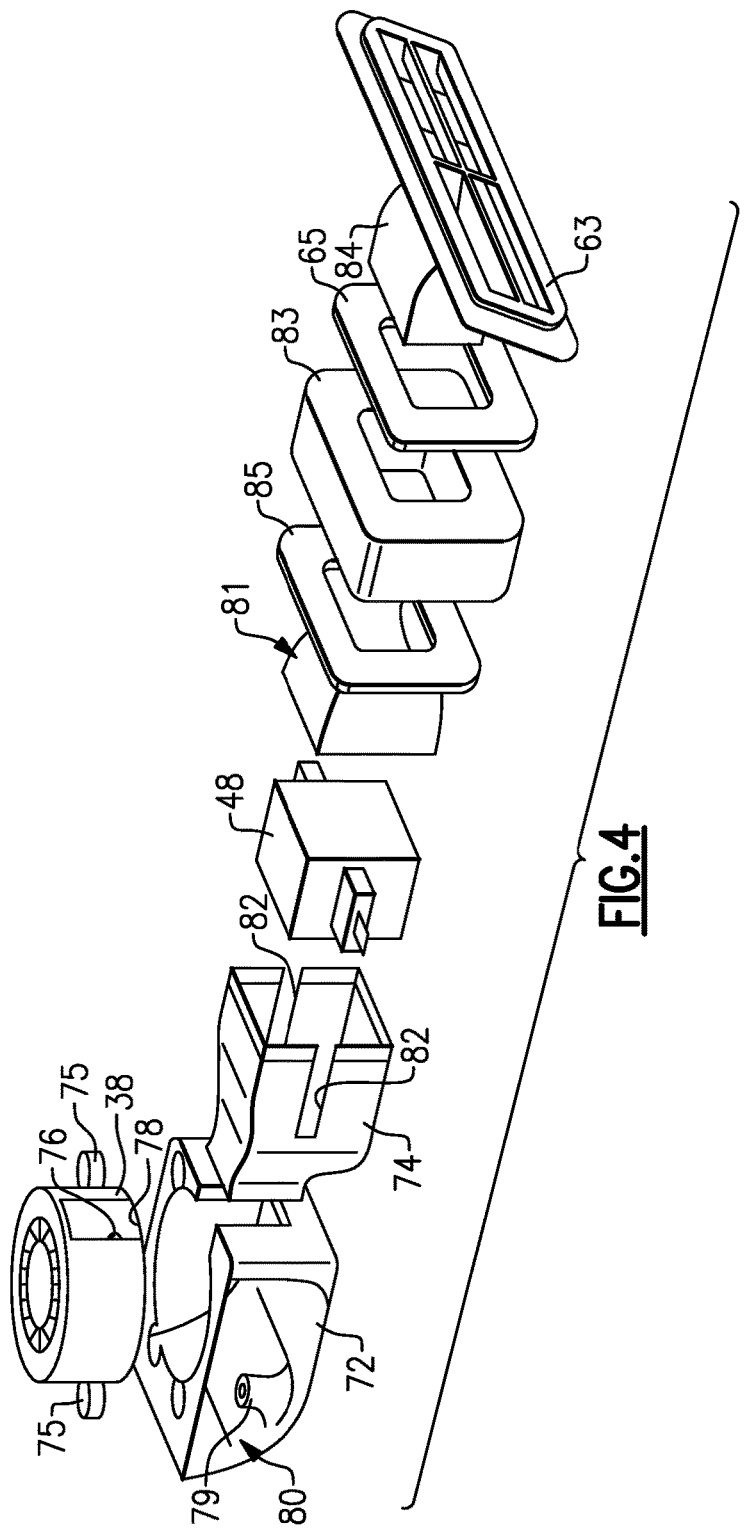
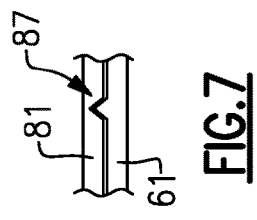
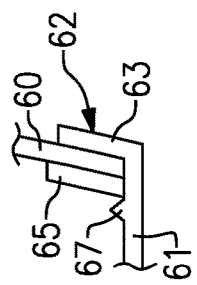
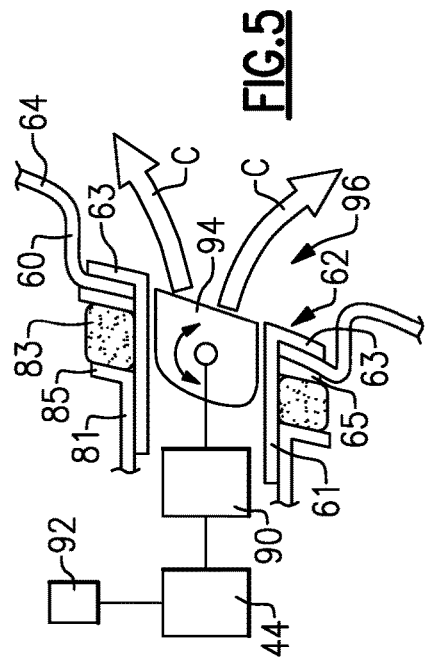

VEHICLE HEADREST THERMAL CONDITIONER

CROSS-REFERENCE TO RELATED APPLICATIONS

This application claims priority to U.S. Provisional Application No. 62/211,459, which was filed on Aug. 28, 2015 and is incorporated herein by reference.

BACKGROUND

This disclosure relates to a vehicle headrest thermal conditioner. The thermal conditioner heats a supply air to provide conditioned air to a neck area of an occupant.

Vehicle manufacturers have increasingly included features to improve comfort of the vehicle occupant. One such feature has provided heated air to a neck area of the occupant through a headrest of the vehicle seat. In one arrangement, a backside of the headrest includes a large opening through an aesthetic cover. Supply air is pulled through the large opening to be heated by a PTC heating element. Heated air is delivered through a vent in a forward facing surface of the headrest.

The headrest vent is located in close proximity to the occupant's head. Since the headrest is designed to absorb an impact from the occupant's head during a collision, it is desirable to assemble the thermal conditioner in a manner that capable of absorbing impact.

SUMMARY

In one exemplary embodiment, a seat headrest assembly includes a core that includes a core bottom. A thermal conditioning device includes a housing that provides a fluid passage that extends to a vent. A heating module and a blower are arranged in the fluid passage. The thermal conditioning device is arranged beneath the core bottom.

In a further embodiment of the above, a collapsible member is provided between the vent and thermal conditioning device.

In a further embodiment of any of the above, the collapsible member is provided by a foam gasket.

In a further embodiment of any of the above, the housing includes a duct that provides the fluid passage. The vent and the duct are telescopically received and collapsible with respect to one another to provide the collapsible member.

In a further embodiment of any of the above, a cushion member is arranged over the core. The cushion member includes a cavity. The thermal conditioning device is arranged in the cavity.

In a further embodiment of any of the above, a retainer and an aesthetic cover are arranged over the cushion member to provide a headrest bottom and a head support surface. The post extends from the headrest bottom. The vent is in communication with the passage and is provided in the head support surface with the aesthetic cover captured between the retainer and the vent.

In a further embodiment of any of the above, a hole is provided in a headrest bottom and is in fluid communication with the cavity within the seat headrest assembly. The hole is configured to provide supply air to the thermal conditioning device.

In a further embodiment of any of the above, the vent includes a movable portion. A motor is connected to the movable portion and is configured to position the movable portion between multiple angular positions in response to an electrical input.

In a further embodiment of any of the above, the housing includes opposing open sides configured to receive a supply air from the cavity. The blower is arranged between the opposing open sides.

In a further embodiment of any of the above, an aesthetic cover is arranged over the core and includes a recessed pocket. The vent is arranged within the recessed pocket and is spaced from the core.

In a further embodiment of any of the above, the core bottom provides a plane. The heating module and blower are arranged beneath the plane.

In a further embodiment of any of the above, the fluid passage is configured to provide a linear airflow from the blower through the heating module to a fluid outlet provided by the fluid passage.

In a further embodiment of any of the above, the heating module is a positive temperature coefficient heating element.

In a further embodiment of any of the above, the housing includes opposing slots that are configured to support the positive temperature coefficient heating element within the fluid passage.

In another exemplary embodiment, a seat air conditioning system includes a headrest that includes a core that provides a plane. A head support surface is provided above the plane. A vent in the headrest is provided below the plane. A thermal conditioning device includes a housing that provides a fluid passage that extends to the vent. A heating module and a blower are arranged in the fluid passage. The thermal conditioning device is arranged beneath the plane. A collapsible member is provided between the vent and thermal conditioning device.

In a further embodiment of any of the above, the headrest includes an aesthetic cover that provides the head support surface and a recessed pocket. The vent is arranged within the recessed pocket and is spaced from the head support surface.

In a further embodiment of any of the above, a controller and an input is in communication with the controller. The controller is configured to provide a command to the thermal conditioning device in response to the input. The command is configured to preheat the heating module for a predetermined time before actuating the blower.

In a further embodiment of any of the above, the heating module is a positive temperature coefficient heating element.

In a further embodiment of any of the above, a controller and an input are in communication with the controller. The vent includes a movable portion. A motor is connected to the movable portion. The controller is configured to provide a command to the thermal conditioning device in response to the input. The command is configured to position the movable portion between multiple angular positions.

In a further embodiment of any of the above, the fluid passage is configured to provide a linear airflow from the blower through the heating module to the vent.

BRIEF DESCRIPTION OF THE DRAWINGS

The disclosure can be further understood by reference to the following detailed description when considered in connection with the accompanying drawings wherein:

FIG. 1A schematically depicts an occupant in an example vehicle seat.

FIG. 1B schematically illustrates attachment of a thermal conditioning device within a headrest to a support structure.

FIG. 2 is a schematic view of an example thermal conditioning device for a seat portion, such as a headrest.

FIG. 4 is an exploded view of one example thermal conditioning device embodiment.

FIG. 5 schematically depicts an adjustable vent for a headrest.

FIG. 6 is a cross-sectional view through the vent and a retainer.

FIG. 7 is a cross-sectional view through a duct and the vent.

Figure 3:
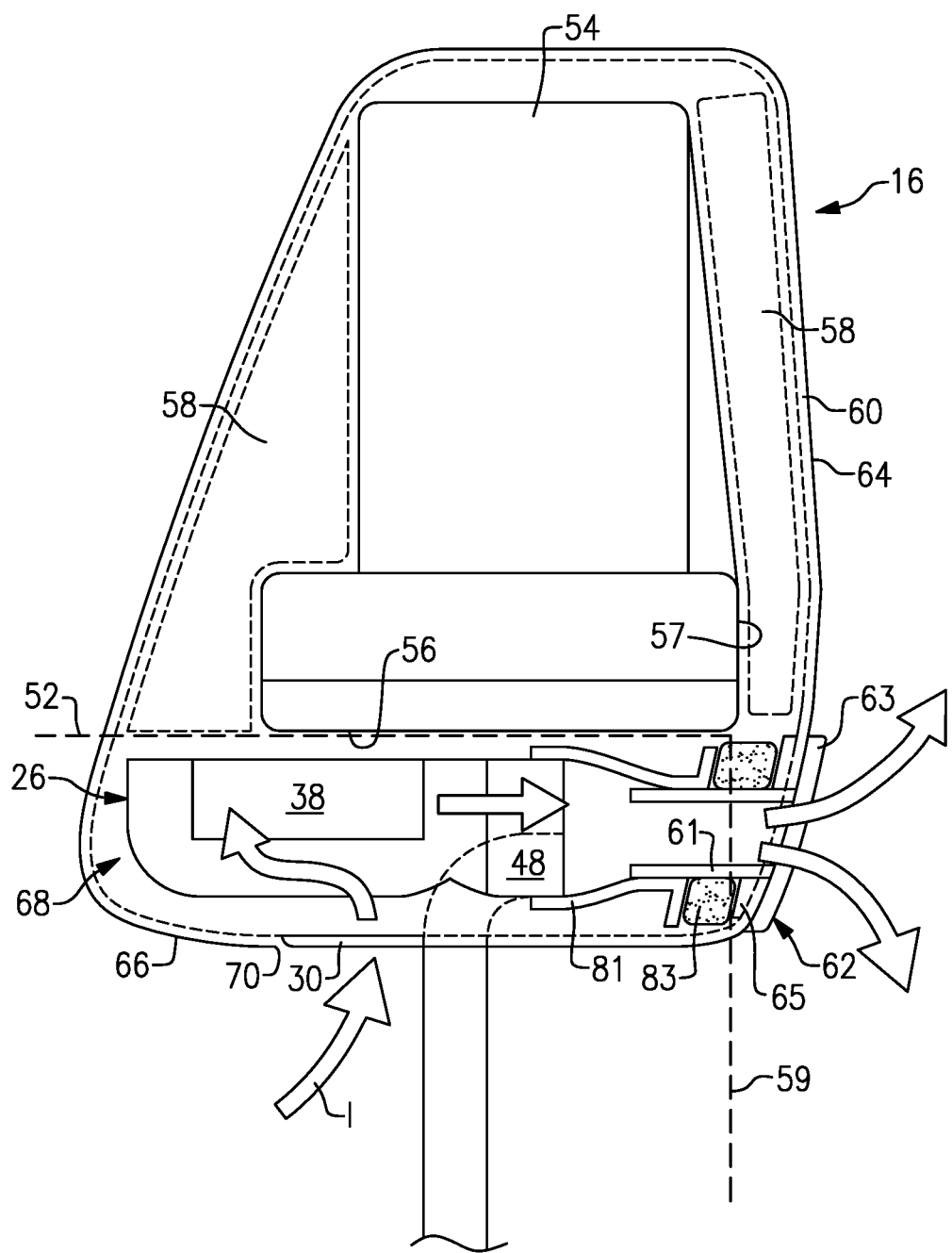
FIG. 3 illustrates one example headrest embodiment.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

FIG. 1A illustrates an occupant 20 in a seat 10. The seat 10 includes a bottom 12 and a back 14. In the example, a headrest 16 is supported on the back 14 by posts 18. Although a discrete headrest 16 is shown in the example seat 10, it should be understood that the headrest 16 may be integrated with the back 14 in which case the posts 18 may be provided by a seat back frame.

A thermal conditioning device 22 is arranged in a seat portion of the seat 10, such as the headrest 16. The thermal conditioning device 22 is configured to direct a conditioned air to a neck area 24 of the occupant 20. The neck area 24 may also include the head and upper back of the occupant 20. In one example embodiment, the thermal conditioning device 22 is contained in the headrest of a seat used in a coupe. The thermal conditioning devices 22 is secured to a support structure 19, such as the posts 18 or a core 54.

A schematic view of an example thermal conditioning device 22 is illustrated in FIG. 2. The thermal conditioning device 22 includes a housing 26 providing a passage 28. The passage 28 communicates a supply air I from a fluid inlet 30 through a heating module 36 arranged in the passage 28 to a fluid outlet 32. A blower 38 is arranged in the passage 28 to move the fluids through the housing 26. The fluid outlet 32 provides a conditioned air C to the neck area 24 of the occupant.

An input device 42, such as a switch or touch screen, communicates with the heating module 36 and the blower 38 to selectively provide one or more levels of unconditioned air or heated, conditioned air to the neck area 24. Additional input devices may be provided. A power source 46 is connected to the thermoelectric module 36 and blower 38 and is operated by the input device 42. Wires (not shown) may be routed through the posts 18. A controller 44 controls operation of the heating module 36 and the blower 38 based on inputs from the input device 42. The controller 44 may include a processor and non-transitory memory where computer readable code for controlling operation is stored. In various examples, the controller 44 is integrated within the bottom 12, the back 14, or the blower 38.

In terms of hardware architecture, such a controller can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller may be a hardware device for executing software, particularly software stored in memory. The processor can be a custom made or commercially available processor, a central processing unit (CPU), an auxiliary processor among several processors associated with the controller, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, etc.). Moreover, the memory may incorporate electronic, magnetic, optical, and/or other types of storage media. The memory can also have a distributed architecture, where various components are situated remotely from one another, but can be accessed by the controller.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The input/output devices that may be coupled to system I/O Interface(s) may include input devices, for example, but not limited to, a scanner, microphone, camera, proximity device, etc. Further, the input/output devices may also include output devices, for example but not limited to a display, etc. Finally, the input/output devices may further include devices that communicate both as inputs and outputs, for instance but not limited to, a modulator/demodulator (for accessing another device, system, or network), a radio frequency (RF) or other transceiver, a bridge, a router, etc.

When the controller is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

In one example, the heating module 36 includes a positive temperature coefficient (PTC) heating element 48, which self-regulates its temperature. If a resistive heating element is desired, a pulse width modulation (PWM) modulator may be used to regulate the heating module 36 by controlling PTC duty cycle. In one example, the controller 44 is operably coupled to the power source 46 and the switch 42, and independently controls an amount of power supplied by the power source 46 to the blower 38, and the PTC 48. In one embodiment, the controller 44 is configured to provide a command to the heating module 36 in response to the input. For example, the command is configured to preheat the heating module 36 for a predetermined time before actuating the blower 38 when the ambient temperature is below a predetermined value, such as 32° F. or another temperature indicative of undesirably cold temperatures. Otherwise, cold air may be blown onto the occupant, creating thermal discomfort. The preheat can be initiated when the vehicle has been remotely started or the door is unlocked or opened. In various embodiments, the command may be configured to actuate the blower 38 at a low, predetermined speed for a predetermined time during preheating.

With the PTC off, the blower 38 can be operated to provide a vent mode in which unconditioned air is directed onto the occupant. It should also be understood that a cooling device can be used in the thermal conditioning device 22, such as a Peltier-based thermoelectric device.

Referring to FIG. 3, the core 54 of the headrest 16 is designed to absorb an impact from the occupant's head in the event of a vehicle crash. The core 54 is mounted to posts 18. The posts 18 may be omitted in seats where the headrest has been integrated into the back. A cushion member 58, typically foam, is wrapped about the core 54, and an aesthetic cover 60 is arranged about the cushion member 58. The core 54, cushion member 58 and aesthetic cover 60 together form a first head support structure mounted to the posts 18. The cushion member 58 provides a cavity 68. The housing 26 is arranged within the cavity 68 and the aesthetic cover 60 to permit the supply air I to flow into the housing 26.

As shown in FIGS. 2 and 3, the core 54 includes a core bottom 56 that provides a plane 52. The thermal conditioning device 22, including the blower 38 and the PTC 48, is arranged beneath and parallel to the plane 52 of the core bottom 56, which enables the cushion member 58 to more fully cover the backside of the core 54. Additionally, the fluid passage 28 is provides a linear airflow from the blower 38 through the heating module 36 to the fluid outlet 32.

A conditioned air vent 62 includes a neck 61 that extends through a head support surface 64 of the headrest 16. A vent face 63 is joined to the neck 61 and provide the fluid outlet 32 below the plane 52 in the example. The conditioned air vent 62 may also be a single, monolithic piece, if desired. A retainer 65 is secured to the conditioned air vent 62 to capture the aesthetic cover 60 between the vent face 63 and the retainer 65. In the example shown in FIG. 6, a protrusion 67 on the neck 61 maintains the retainer 65 clamped about the aesthetic cover 60.

The posts 18 are provided in a bottom 66 of the headrest 16. The supply air I enters the bottom 66 through holes 70, which adjoin the posts 18, to communicate the supply air I to the cavity 68. As a result, the back of the headrest 16 is more attractive to rear occupants of the vehicle. This also allows for padding to be placed on the back of the headrest, providing protection against rear occupant impact with the back of the headrest in a manner that is free from trimmed openings providing an inlet or an outlet.

Referring to FIGS. 3 and 4, the housing 26 is shown in more detail. The housing 26, which may be plastic, is constructed from multiple portions in the example, although it should be understood that the housing 26 may be constructed from fewer or a greater number of components than shown. The housing 26 includes first and second housing portions 72, 74 secured to one another. A top of the first housing portion 72 includes an aperture that receives the blower 38. A bottom of the blower 38 provides a blower inlet 76 and is secured to a bottom of the first housing portion 72 at posts 79 by ears 75. Opposing sides 80 of the first housing portion 72, between which the blower 38 is arranged, are open to receive the supply air I entering the cavity 68 through the holes 70.

A blower outlet 78 adjoins the second housing portion 74. The conditioned air vent 62 is received in an opening in the second housing portion 74. The heating element 48 is received in opposing slots 82 in the second housing portion 74. The second housing portion 74 and conditioned air vent 62 are secured to one another about the heating module 36.

A duct 81 is mounted to the second housing portion 72 and receives the neck 61 such that the conditioned air vent 62 can move telescopically inward with the respect to the duct 81 during a collision. In one embodiment, the conditioned air vent 62 moves flush with or behind a plane 59 provided by a forward face 57 of the core 54 during an impact.

A flexible gasket 83 provides a collapsible member, along with the movable conditioned air vent 62, arranged between a flange 85 on the duct 81 and the retainer 65. In one example, the gasket 83 is a thick foam adhered to both the flange 85 and the retainer 65 for improved handling during headrest assembly. Interlocking features 87, such as a snap-fit, between the duct 81 and the conditioned air vent 62 in an assembled position, as shown in FIG. 7. The gasket 83 absorbs energy while collapsing when the conditioned air vent 62 slides relative to the duct 81.

To facilitate assembly of the headrest 16, the retainer 65 may act as a cutting template enabling a worker to cut a hole in the aesthetic cover 60 using the retainer's opening as a guide. The conditioned air vent 62 may then be inserted into the opening, snapping the neck 61 to the retainer 65 and abutting the vent face 63 against the aesthetic cover 60.

The cushion member 58 and the gasket 83 are more compliant than the core 54. In one example, the core 54 has a compression stiffness greater than, and in one example at least two times, the compression stiffness of the cushion member 58. The cushion member 58 has a compression stiffness greater than, and in one example at least two times, the compression stiffness of the gasket 83.

In the example shown in FIG. 5, a recessed pocket 96 is provided in the headrest 16, and the vent 62 is arranged in the recessed pocket 96. In this manner, the vent 62 may positioned further away from the head support surface 64.

The vent 62 may have a movable portion 94 that permits the louvers of the vent to be oriented in a desired position based upon occupant preference. A motor 90 is connected to the movable portion 94 to position the movable multiple angular positions in response to an electrical input, such as switch 92 since it may be difficult for the occupant to adjust the angular position of the louvers. The motor 90 may also be used to oscillate the louvers, if desired.

The thermal conditioning device 22 is incorporated into the seat in such a manner so as to not inhibit the impact absorbing function of the core 54. The thermal conditioning device 22 can be fastened to the posts 18 independent of the core 54 and/or cushion member 58 to create a second load path. Thus, the thermal conditioning device 22 may form a second head support structure that transfers occupant loads to the posts 18 and easily moves out of the way during impact. In this manner, the second support structure can move independently of the first support structure, which provides primary impact absorbing. Furthermore, the collapsible member (e.g., gasket 83 and conditioned air vent 62), by way of translation in the example, is able to move a large distance under impact such that the majority of the impact is absorbed by the first head support structure.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A seat headrest assembly comprising:
   a core including a core bottom;
   a thermal conditioning device including a housing providing a fluid passage that extends to a vent, and a heating module and a blower are arranged in the fluid passage, wherein the thermal conditioning device is arranged beneath the core bottom, wherein the vent includes a movable portion, and a motor is connected to the movable portion and is configured to position the movable portion between multiple angular positions in response to an electrical input.

2. The seat headrest assembly according to claim 1, wherein the collapsible member includes a foam gasket provided between the vent and thermal conditioning device.

3. The seat headrest assembly according to claim 1, comprising a cushion member arranged over the core, the cushion member includes a cavity, and the thermal conditioning device is arranged in the cavity.

4. The seat headrest assembly according to claim 3, comprising a retainer, and an aesthetic cover arranged over the cushion member to provide a headrest bottom and a head support surface, a post extends from the headrest bottom, and the vent is in communication with the passage and provided in the head support surface with the aesthetic cover captured between the retainer and the vent.

5. The seat headrest assembly according to claim 4, wherein a hole is provided in a headrest bottom and in fluid communication with the cavity within the seat headrest assembly, the hole is configured to provide supply air to the thermal conditioning device.

6. The seat headrest assembly according to claim 3, wherein the housing includes opposing open sides configured to receive a supply air from the cavity, wherein the blower is arranged between the opposing open sides.

7. The seat headrest assembly according to claim 1, comprising an aesthetic cover arranged over the core and including a recessed pocket, the vent is arranged within the recessed pocket and is spaced from the core.

8. The seat headrest assembly according to claim 1, wherein the core bottom provides a plane, and the heating module and blower are arranged beneath the plane.

9. The seat headrest assembly according to claim 8, wherein the fluid passage is configured to provide a linear airflow from the blower through the heating module to a fluid outlet provided by the fluid passage.

10. The seat headrest assembly according to claim 1, wherein the heating module is a positive temperature coefficient heating element.

11. The seat headrest assembly according to claim 10, wherein the housing includes opposing slots configured to support the positive temperature coefficient heating element within the fluid passage.

12. A seat air conditioning system comprising:
    a headrest including a core that provides a plane, a head support surface provided above the plane;
    a vent in the headrest provided below the plane;
    a thermal conditioning device including a housing providing a fluid passage extending to the vent, and a heating module and a blower are arranged in the fluid passage, wherein the thermal conditioning device is arranged beneath the plane;
    a collapsible member provided between the vent and thermal conditioning device, wherein the vent and the duct are telescopically received and collapsible with respect to one another to provide the collapsible member that is configured to absorb energy during an impact; and
    a controller and an input in communication with the controller, wherein the vent includes a movable portion, and a motor is connected to the movable portion, the controller configured to provide a command to the thermal conditioning device in response to the input, the command configured to position the movable portion between multiple angular positions.

13. The seat air conditioning system according to claim 12, wherein the headrest includes an aesthetic cover providing the head support surface and a recessed pocket, the vent is arranged within the recessed pocket and is spaced from the head support surface.

14. The seat air conditioning system according to claim 12, comprising a controller and another input in communication with the controller, the controller configured to provide another command to the thermal conditioning device in response to the other input, the other command configured to preheat the heating module for a predetermined time before actuating the blower.

15. The seat air conditioning system according to claim 14, wherein the heating module is a positive temperature coefficient heating element.

16. The seat air conditioning system according to claim 12, wherein the fluid passage is configured to provide a linear airflow from the blower through the heating module to the vent.

* * * * *